United States Patent
Han et al.

(10) Patent No.: US 11,902,754 B2
(45) Date of Patent: Feb. 13, 2024

(54) AUDIO PROCESSING METHOD, APPARATUS, ELECTRONIC DEVICE AND STORAGE MEDIUM

(71) Applicant: Lenovo (Beijing) Limited, Beijing (CN)

(72) Inventors: Junning Han, Beijing (CN); Rongbin Xiao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 18 days.

(21) Appl. No.: 17/684,392

(22) Filed: Mar. 1, 2022

(65) Prior Publication Data
US 2023/0074395 A1  Mar. 9, 2023

(30) Foreign Application Priority Data
Sep. 7, 2021  (CN) .......................... 202111046004.X

(51) Int. Cl.
*H04R 3/00* (2006.01)
*G06T 7/70* (2017.01)
*H04R 5/027* (2006.01)

(52) U.S. Cl.
CPC .............. *H04R 3/005* (2013.01); *G06T 7/70* (2017.01); *H04R 5/027* (2013.01); *H04R 2420/07* (2013.01)

(58) Field of Classification Search
CPC .... H04R 2420/07; H04R 3/005; H04R 5/027; H04R 2430/03; H04R 2460/07; H04R 29/001; H04R 3/04; H04H 20/16; H04H 60/07; H04H 60/51; H04H 60/65; H04L 12/12; H04L 67/12; H04L 9/3278; H04M 1/72412; H04M 1/72415; H04M 1/72427; H04M 1/7243; H04M 2250/52; H04S 2400/01; H04S 2400/03; H04S 2400/13; H04S 2420/01; H04S 2420/03; H04S 3/00; H04S 3/004; H04S 3/008; H04S 7/30; H04S 7/302; H04S 7/306; H04S 7/307; H04W 4/024; G10K 15/12
USPC ......................................... 381/22–26, 56–58
See application file for complete search history.

(56) References Cited

U.S. PATENT DOCUMENTS

| | | | |
|---|---|---|---|
| 7,386,139 B2 * | 6/2008 | Hashimoto ............. | H04S 3/008 381/310 |
| 10,110,994 B1 * | 10/2018 | Davis ..................... | H04R 1/406 |
| 2003/0059061 A1 * | 3/2003 | Tsuji ..................... | H04M 3/569 348/E7.083 |

(Continued)

*Primary Examiner* — Lun-See Lao
(74) *Attorney, Agent, or Firm* — ANOVA LAW GROUP, PLLC

(57) ABSTRACT

Embodiments of the present disclosure disclose an audio processing method, an audio processing apparatus, and storage medium. The audio processing apparatus obtains first audio data of a target speaker acquired by the audio acquisition device on the target speaker, and obtains second audio data acquired by the electronic device on where the target speaker is located. According to a position of the target speaker relative to the electronic device, the first audio data is combined with the second audio data to obtain target audio data, where, when the target audio data is output, voice of the target speaker aligns with the spatial location. Accuracy of the spatial effect of the target speaker's voice in the target audio data is relatively ensured.

20 Claims, 4 Drawing Sheets

(56) References Cited

U.S. PATENT DOCUMENTS

| | | | |
|---|---|---|---|
| 2014/0297289 A1* | 10/2014 | Mori | G10L 17/00 704/275 |
| 2015/0230025 A1* | 8/2015 | Loether | H04R 27/00 381/79 |
| 2021/0056965 A1* | 2/2021 | Hou | G10L 25/21 |

* cited by examiner

AUDIO PROCESSING METHOD, APPARATUS, ELECTRONIC DEVICE AND STORAGE MEDIUM

RELATED APPLICATION(S)

This application claims priority to Chinese Patent Application No. 202111046004.X filed with the National Intellectual Property Administration, PRC on Sep. 7, 2021, which is incorporated herein by reference in entirety.

FIELD OF THE TECHNOLOGY

The present disclosure relates to the technical field of audio processing, and more particularly, to an audio processing method, apparatus, electronic device, and storage medium.

BACKGROUND

With the popularity of video recording and sharing, people shoot and share videos through portable devices (such as mobile phones, and tablets). However, when portable devices are employed to record audio/video, the audio recording effect may not be satisfactory. For example, when the device is relatively close to the audio/video character, the character's voice may be recorded, but the recording may not cover the entire sound scene. That is, the recording may not express the environment in which the character is located. When the device is relatively far from the character, the video recording may cover the sound of the entire scene, but due to the distance, the character's voice may become too weak or unclear.

Therefore, there is a technical problem to be solved on how to cover the sound of the entire scene and clearly record the voice of the character during audio/video recording.

SUMMARY

In certain embodiments, the present disclosure provides an audio processing method, device, electronic device, and storage medium, including the following technical solutions:

An audio processing method applied to an electronic device, the method including: obtaining a first audio data of a target speaker and a second audio data of the environment where a target speaker is located, where, the first audio data is acquired by an audio acquisition device on the target speaker, and the second audio data is acquired by the electronic device; obtaining a position of the target speaker relative to the electronic device; according to the position, combining the first audio data with the second audio data to obtain target audio data, where a voice of the target speaker aligns with the position as the target audio data is output.

In certain embodiments, the second audio data is obtained according to audio data acquired by a microphone array of the electronic device; and obtaining the position of the target speaker relative to the electronic device includes: obtaining the position of the target speaker relative to the electronic device by calculation according to the audio data acquired by the microphone array.

In certain embodiments, obtaining the position of the target speaker relative to the electronic device includes: acquiring an image of the target speaker; and processing the image to determine the location of the target speaker relative to the electronic device.

In certain embodiments, combining of the first audio data with the second audio data according to the position includes: determining audio parameters of the first audio data in the electronic device according to the position; and combining the first audio data with the second audio data according to the audio parameters.

In certain embodiments, the position includes: an orientation and a distance of the target speaker relative to the electronic device; and determining the audio parameters of the first audio data in the electronic device according to the position includes: determining audio parameters of an audio channel of the first audio data in the second audio data according to the orientation and distance of the target speaker relative to the electronic device; and combining of the first audio data with the second audio data according to the audio parameters includes: corresponding to the audio channel of the second audio data, combining audio parameters corresponding to the audio channel with the audio channel.

In certain embodiments, the audio parameters include at least one of: sound pressure, phase, and time delay.

In certain embodiments, obtaining the first audio data of the target speaker includes: receiving, through a wireless transmission channel, the first audio data from the audio acquisition device on the target speaker.

An audio processing device, applied to an electronic device, the audio processing device includes: an audio data acquisition module, configured to obtain the first audio data of the target speaker and the second audio data of the environment where the target speaker is located; where, the first audio data is acquired from the audio acquisition device on the target speaker, and the second audio data is acquired by the electronic device; a position obtaining module, configured to obtain the position of the target speaker relative to the electronic device; and a data processing module, configured to combine the first audio data with the second audio data according to the position to obtain target audio data; where, when the target audio data is output, a voice of the target speaker aligns with the location.

An electronic device, includes: a memory for storing a program; a processor for calling and executing the program in the memory, and implementing each step of any one of the above-mentioned audio processing method by executing the program.

A readable storage medium on which a computer program is stored, and when executed by a processor, the computer program implements each step of the audio processing method described in any one the above-mentioned methods.

In certain embodiments, in the audio processing method, device, electronic device and storage medium provided by the present disclosure, the electronic device obtains the first audio data of the target speaker acquired by the audio acquisition device on the target speaker, and obtains the second audio data acquired by the electronic device on the environment where the target speaker is located, according to a position of the target speaker relative to the electronic device, the first audio data is combined with the second audio data to obtain target audio data; where, the target audio data is output, the target speaker's voice aligns with the location. Since the first audio data is acquired by the audio acquisition device on the target speaker, the clarity of the first audio data is relatively ensured, while the second audio data is acquired by the electronic device, which helps ensure that the second audio data covers the sound of the entire scene. According to the position of the target speaker relative to the electronic device, after the first audio data is combined with the second audio data, it is relatively ensured that the target audio data can not only cover the entire scene sound, but also clearly output the target speech. Moreover, the target speaker's voice aligns with the position when the target audio data is output, so as to relatively ensure the accuracy of the spatial effect of the target speaker's voice in the target audio data.

BRIEF DESCRIPTION OF THE DRAWINGS

In order to explain the technical solutions of the embodiments of the present disclosure more clearly, the following briefly introduces the accompanying drawings for the embodiments. The drawings in the following description are only some embodiments of the present disclosure. For those of ordinary skill, other drawings may also be obtained from these drawings without any creative effort.

The terms "first", "second", "third", "fourth", etc. (as applicable) in the description and claims and the drawings are employed to distinguish similar parts and not necessarily to describe a particular order or sequence. Data thus used may be interchangeable under appropriate circumstances, such that embodiments of the present disclosure may be practiced in sequences other than those illustrated herein.

DETAILED DESCRIPTION

The technical solutions in the embodiment(s) of the present disclosure are described below with reference to the accompanying drawings. The described embodiments are only a part of the embodiments of the present disclosure, and are not all the embodiments. Based on the embodiments in the present disclosure, all other embodiments obtained by those of ordinary skill in the art without creative efforts may fall within the protection scope of the present disclosure.

The audio processing method provided in the embodiment of the present disclosure is applied to an electronic device, and the electronic device may be a portable electronic device, such as a smart phone, a tablet computer, and the like. The electronic device acquires audio data.

Figure 1:
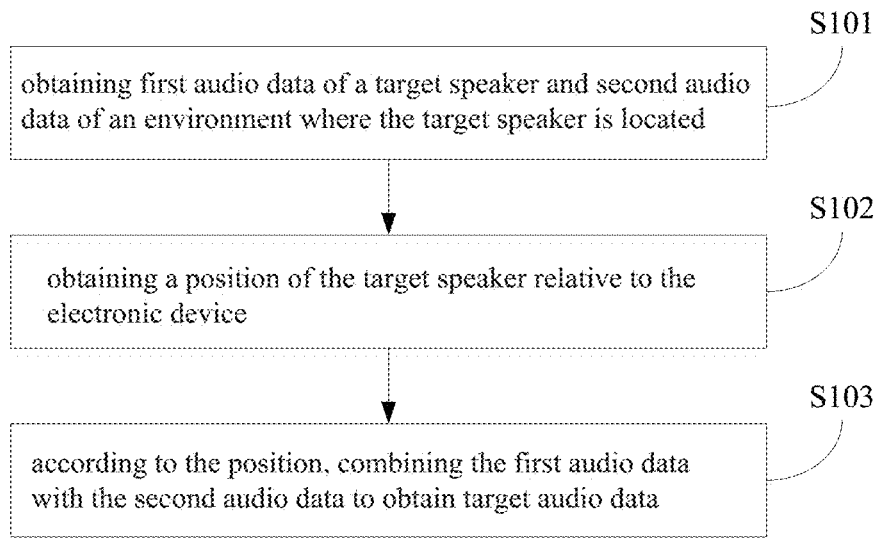
FIG. 1 is a schematic implementation flowchart of an audio processing method according to embodiment(s) of the present disclosure.

As shown in FIG. 1, an implementation flowchart of the audio processing method provided by embodiment(s) of the present disclosure may include:

Step S101: Obtaining first audio data of a target speaker and second audio data of an environment where the target speaker is located, wherein the first audio data is acquired by an audio acquisition device on the target speaker, and the second audio data is acquired by an electronic device.

In certain embodiments, the audio acquisition device may be worn by the target speaker or otherwise be supported on the body of the target speaker.

The audio acquisition device on the target speaker may be a wired/wireless headset or a wired/wireless microphone. Since it may be worn on the target speaker, the target speaker's voice can be clearly recorded. Compared with the audio acquisition device worn by the target speaker, the electronic device is farther away from the target speaker, so the electronic device can record the sound of the target speaker's environment (that is, the sound of a larger scene).

The audio acquisition device may transmit the first audio data to the electronic device through a wired transmission channel (for example, through a universal serial bus). Alternatively, the audio acquisition device may transmit the first audio data to the electronic device through a wireless transmission channel (for example, through Bluetooth or WiFi).

There can be only one target speaker or more than one. When there are multiple target speakers, each speaker wears an audio acquisition device.

Step S102: Obtaining a position of the target speaker relative to the electronic device.

In certain embodiment(s), the position is alternatively referred to as spatial position.

The spatial position of the target speaker relative to the electronic device may include at least one of: an orientation of the target speaker relative to the electronic device (that is, in which direction the target speaker is relative to the electronic device), and a distance of the target speaker relative to the electronic device (that is, the distance between the target speaker and the electronic device).

The spatial position of the target speaker relative to the electronic device may be determined through a camera. Alternatively, the spatial position of the target speaker relative to the electronic device may be determined through a microphone array.

When there are multiple target speakers, the spatial position of each target speaker relative to the electronic device is obtained.

Step S103: Combining the first audio data with the second audio data according to the spatial position to obtain target audio data, where, the target speaker's voice corresponds to or aligns with the spatial position when the target audio data is being output.

In certain embodiment(s), combining the first audio data with the second audio data may be performed by mixing the first audio data into the second audio data.

When there are multiple target speakers, the first audio data of each target speaker is mixed into the second audio data according to the spatial position of each target speaker relative to the electronic device. In certain embodiment(s), for the $i^{th}$ target speaker, the first audio data of the $i^{th}$ target speaker is mixed into the second audio data according to the spatial position of the $i^{th}$ target speaker relative to the electronic device. That is to say, when there are multiple target speakers, multiple pieces of first audio data will be mixed into the second audio data.

In addition, when mixing the first audio data into the second audio data, the first audio data and the second audio data may be time-series aligned. For example, based on the occurrence that the first audio data and the second audio data include the same audio signals (that is, the words spoken by the target speaker are both acquired by the audio acquisition device on the user and acquired by the microphone on the electronic device) are time-series aligned, and then, according to the spatial position, the first audio data is mixed into the first audio data.

In certain embodiment(s), when mixing the first audio data into the second audio data, the orientation of the audio acquisition device relative to the electronic device is considered, so that when the first audio data is mixed into the second audio data to obtain the target audio data, and when the target audio data is being output, the target speaker's voice is in alignment with the spatial position of the audio acquisition device relative to the electronic device. In certain embodiment(s), when for example the target speaker is 5 meters left to the electronic device, when the target audio data obtained by mixing the first audio data with the second audio data is being output, one can sense that the target speaker is 5 meters left to the electronic device. However, if the spatial position of the audio acquisition device relative to the electronic device is not considered, and rather the first audio data is directly mixed into the second audio data without considering the spatial position, the target audio data as obtained may sound as if the target speaker is speaking at a location 10 meters above the electronic device.

In certain embodiment(s), since the first audio data is acquired by the audio acquisition device on the target speaker, the clarity of the first audio data may be ensured, while the second audio data is acquired by the electronic device, which may ensure that the target audio data obtained after the mixing cover the entire audio of a larger scene, while clearly transmitting the target speaker's voice. Moreover, due to the alignment of the target speaker's voice with the spatial position as the target audio data is being output, a spatial effect accuracy of the target speaker's voice in the target audio data may be accordingly ensured.

In certain embodiment(s), the second audio data may be obtained according to audio data acquired by a microphone array (for example, including at least three microphones) of the electronic device.

In certain embodiment(s), the second audio data may be 360-degree omnidirectional audio data acquired by the electronic device through the microphone array, or may be audio data in the left and right directions of the electronic device acquired by the microphone array, so as to generate 3-dimensional (3D) stereo sound using the audio data as acquired. The left and right directions refer to two exteriors of two parallel sides of the electronic device. For example, the left exterior refers to an outer side of one length or long side (referred to as the first length side) of the electronic device in a horizontal screen state, the right exterior refers to an outer side of another length or long side (referred to as the second length side) parallel to the first length side of the electronic device. Alternatively, the left exterior refers to an outer side of one width or short side (referred to as the first width side) of the electronic device in a horizontal screen state the right exterior refers to an outer side of another width or short side (referred to as the second width side) parallel to the first width side of the electronic device.

In certain embodiment(s), based on a spatial alignment formed between a left spatial position and a first receiving beam generated at the left side of the electronic device by the microphone array, and based on a spatial alignment formed between a right spatial position and a second receiving beam generated at the right side of the electronic device by the microphone array, such that audio signals at the left side of the electronic device may be focused on through the first receiving beam, and such that audio signals from other than the left side of the electronic device may be suppressed, audio signals at the right side of the electronic device may be focused on through the second receiving beam, and such that audio signals from other than the right side of the electronic device may be suppressed, so as to generate the 3D stereo sound.

In certain embodiment(s), the second audio data may be an audio signal directionally acquired through left and right microphones of the electronic device. For example, the left microphone acquires an audio signal within a 60-degree range that spreads to the left from the left microphone as a center, and the right microphone acquires audio signals within a 60-degree range that spreads to the right from the right microphone as a center.

In certain embodiment(s), the audio processing method further includes determining a target speaker. A sound source existing relative to a spatial range of the electronic device is determined by a microphone array of the electronic device, the microphone array including a plurality of microphones, and there may be one sound source or multiple sound sources. A sound positioning and tracking engine of the electronic device determines, according to a predetermined condition, a sound source that satisfies the predetermined condition as a target speaker for positioning and tracking (for example, to record a position change of the sound source that satisfies the condition). If the target speaker moves while speaking, the voice positioning and tracking engine may continuously locate and record the target speaker, such that the first audio data, acquired by the audio acquisition device worn by the target speaker and later mixed with the second audio data, may include parts respectively corresponding to each of the spatial locations experienced by the target speaker. Accordingly, as the target audio data is being output, a listener can perceive that the target speaker is moving while speaking. The predetermined conditions include at least one of: a volume parameter of the sound source exceeds a threshold, a sound quality parameter of the sound source exceeds a threshold, a volume among the multiple sound sources is the largest, and a sound quality among the multiple sound sources is the best.

Further, determining the target speaker may also be determined through the camera of the electronic device. For example, during the video recording process, the target speaker is determined through the activated camera and/or the setting parameters (focus) for the activated camera. In the video recording scene, the camera is aimed at the target speaker. In certain embodiment(s), the field of view (FOV) and acquisition direction of each camera in the multiple cameras integrated on the electronic device are pre-stored. When any camera is activated, the pre-stored field of view (FOV) and acquisition direction can be queried to determine the acquisition orientation and acquisition range of the activated camera relative to the electronic device. The acquisition range and acquisition orientation of the activated camera are employed as the indication information of the sound positioning and tracking engine. The sound location tracking engine determines as the target speaker a target sound source determined based on the indication information. Alternatively, the sound location tracking engine determines as the target speaker a sound source determined to have met the pre-determined condition based on the indication information.

In certain embodiment(s), the acquisition orientation and acquisition range may be adjusted based on the acquisition range and acquisition orientation corresponding to the activated camera based on the setting parameters (focus) of the activated camera. The acquisition orientation and acquisition range thus adjusted may then be employed to as the instruction information for the sound positioning and tracking engine.

In certain embodiment(s), an implementation manner of obtaining the spatial position of the target speaker relative to the electronic device above may be: the spatial position of the target speaker relative to the electronic device is calculated according to the audio data acquired by the microphone array.

The orientation of the target speaker may be identified according to the audio data acquired by the microphone array. For example, a recording character is usually closest to the electronic device, and a sound direction that meets the conditions may be determined as the orientation of the target speaker. When the orientation of the target speaker is determined, the audio signal of the target speaker may also be determined. The sound that satisfies the condition may be the sound that satisfies at least one of: maximum volume, best sound quality, and the like.

According to the time when the target speaker's voice reaches each microphone in the microphone array, the time delay of the target speaker's voice reaching any two microphones is determined. In view of the positions of the microphones in the microphone array and relative position relationship between the microphones, the position of the target speaker relative to the electronic device may be determined by calculation. A distance between the target speaker and the electronic device may be determined based on the position of the target speaker relative to the electronic device and the position of the electronic device.

The above-mentioned solution for obtaining the spatial position of the target speaker relative to the electronic device may be used in an audio recording process or a video recording process.

In certain embodiment(s), in the process of identifying the target speaker based on the audio data, if the voice of another person (not the recording character) in the environment is greater than the voice of the target speaker, the other person is identified as the target speaker instead.

In the process of recording audio or video, when a new audio source that meets the conditions is detected, the focus direction of the image acquisition device is determined according to the image acquired by the image acquisition device. If the focus orientation of the device is the same as the orientation of the target speaker relative to the electronic device determined based on the audio data, the target speaker is not switched to the new audio source. If the focus orientation is different from the orientation of the target speaker relative to the electronic device determined based on the audio data, the target speaker is switched to the new audio source. This avoids recording the voice of a non-recording or unintended character.

In certain embodiment(s), obtaining the spatial position of the target speaker relative to the electronic device may include: acquiring an image of the target speaker (usually the person closest to the camera lens, or, a pre-specified person). The image of the target speaker may be acquired by a binocular camera.

The images are processed to determine the spatial position of the target speaker relative to the electronic device. Based on a distance between two cameras in the binocular camera, a focal length of each camera, and a position of the target speaker in an acquired image, a distance of the target speaker relative to the electronic device may be determined. According to an orientation of the camera in the electronic device, as well as an orientation of the electronic device, an orientation of the target speaker relative to the electronic device may be determined.

This design of obtaining the spatial position of the target speaker relative to the electronic device may also be employed in the audio recording process, and may also be employed in the video recording process. During the audio recording process, since the user may not pay attention to what the video content is, the image captured by the camera may not have to be displayed. To facilitate the user to use the electronic device, an image captured by one of the cameras may be displayed in a small window such as a floating window or a pop-up window, such that the user can determine who the current recording object is.

In a process of recording an audio or a video, a speaker obtained within an acquisition range by the image acquisition device may be determined as the target speaker. Whether there is a change in the target speaker (for example, whether the target speaker is changed from target speaker A to target speaker B) may be determined through image detection acquired by the image acquisition device. When a change in the target speaker has been detected, an orientation of the target speaker as changed relative to the electronic device is determinized, the changed first audio data in the direction of the target speaker relative to the electronic device is acquired, the second audio data of the environment where the target speaker is located is acquired, to obtain the changed spatial position of the target speaker relative to the electronic device (may be determined based on the microphone array, and can also be determined based on the camera). According to the spatial position, the changed first audio data of the target speaker is mixed into the second audio data acquired by the electronic device to obtain the target audio data.

Figure 2:
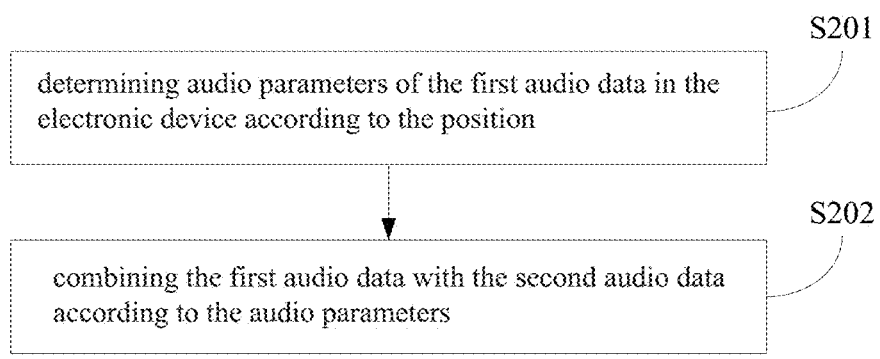
FIG. 2 is a schematic implementation flowchart of combining first audio data with second audio data according to embodiment(s) of the present disclosure.

In certain embodiment(s), an implementation flow chart of mixing the first audio data into the second audio data according to the spatial position is shown in FIG. 2, and may include:

Step S201: Determining audio parameters of the first audio data in the electronic device according to the spatial position.

The audio parameters of the first audio data in the electronic device refer to audio parameters existing when the voice of the target speaker is being acquired by the electronic device.

In certain embodiment(s), the audio parameters may include, but are not limited to, at least one of the following: sound pressure, phase, and time delay. The sound pressure corresponds to a distance, which represents the size of the sound. The phase and time delay each correspond to both distance and orientation, which represent the orientation of the sound source relative to the electronic device.

In certain embodiment(s), the audio data in the electronic device is divided into or includes a left audio channel and a right audio channel. The audio parameters of each audio channel of the first audio data in the second audio data may be determined according to the spatial position. The audio parameters of each audio channel may include, but are not limited to, at least one of the audio parameters listed above.

In certain embodiment(s), audio parameters of the first audio data in each audio channel of the second audio data may be determined according to the orientation and distance of the target speaker relative to the electronic device.

According to a distance of the target speaker relative to the electronic device, and a distance between the two ears of a person (in certain embodiment(s), the distance may be a distance between the two ears of a human head model obtained by statistical analysis of several people in advance), a sound pressure of each audio channel in the second audio data from the first audio data is determined. The greater the distance between the sound source and the human ear, the smaller the sound pressure, and the smaller the distance between the sound source and the human ear, the greater the sound pressure. The phase and time delay of the target speaker's voice in each audio channel of the second video, as the target speaker's voice arrives the electronic device, may be determined according to the position and the orientation of the target speaker relative to the electronic device.

Step S202: Mixing the first audio data into the second audio data according to the audio parameters.

In certain embodiment(s), corresponding to each audio channel of the second audio data, the first audio data is mixed into the audio channel according to the audio parameters corresponding to the each audio channel.

Figure 3A:
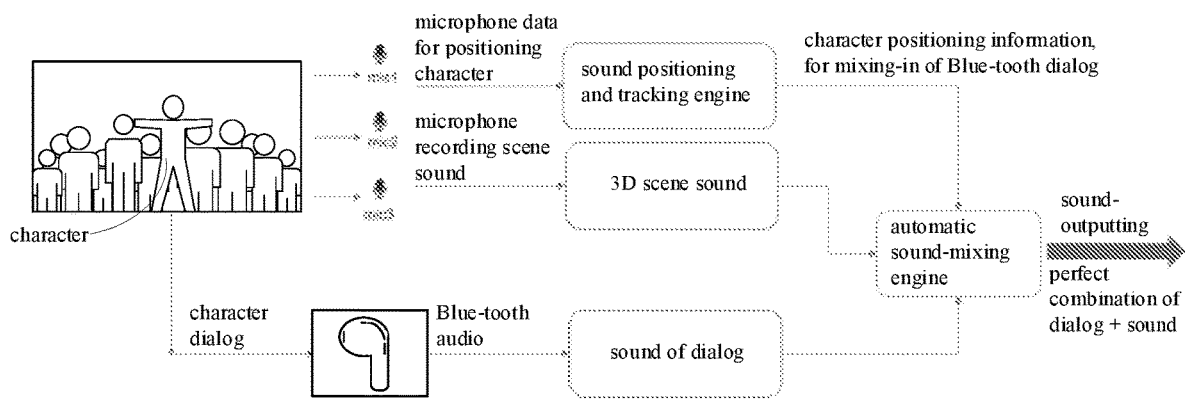
FIG. 3a is a schematic implementation flowchart of combining first audio data with second audio data according to embodiment(s) of the present disclosure.
Figure 3B:
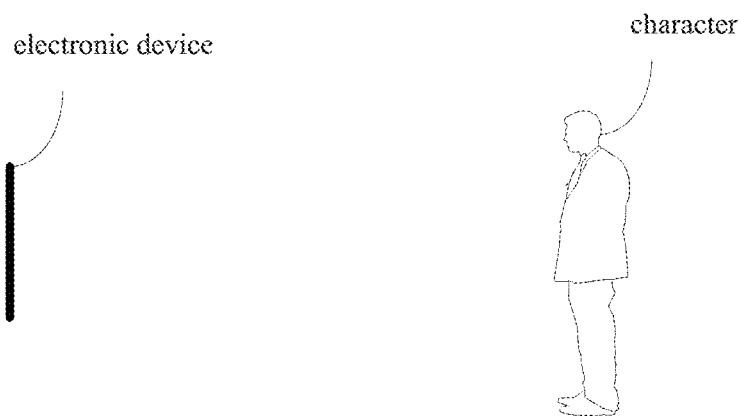
FIG. 3b is a schematic diagram of a positional relationship between the character and the electronic device in FIG. 3a according to embodiment(s) of the present disclosure.

As shown in FIGS. 3a-3b, FIG. 3a is an implementation flowchart of an audio processing method according to certain embodiment(s), and FIG. 3b illustratively depicts a relative position relationship between the character and the electronic device shown in FIG. 3a. What is shown is a process of shooting a multi-person activity scene outdoors. In this scene, the character (that is, the person closest to the camera of the electronic device) wears a Bluetooth headset to state the dialogue, while an electronic device (in a certain distance from the character) with a microphone array including multiple microphones (as shown here, 3 microphones, namely mic1, mic2, mic3) records the video of the event scene. $$In this scene, the three microphones are used to record the sound of the scene (usually 3D sound), and are also used to locate the character. The sound positioning and tracking engine can be used to obtain the positioning information of the character (that is, the spatial position of the character relative to the electronic device). A sound-mixing engine can mix the sound of the dialogue into the 3D sound of the large scene based on the positioning information of the character.

Embodiments of the present disclosure are not just applicable to outdoor scenarios. Embodiments of the present disclosure are also applicable to indoor scenarios, applicable to not only multi-person scenarios, but also scenarios with a single person and a noisy surrounding environment (for example, a person in a windy and rainy day video recording outdoors, etc.).

Figure 4:
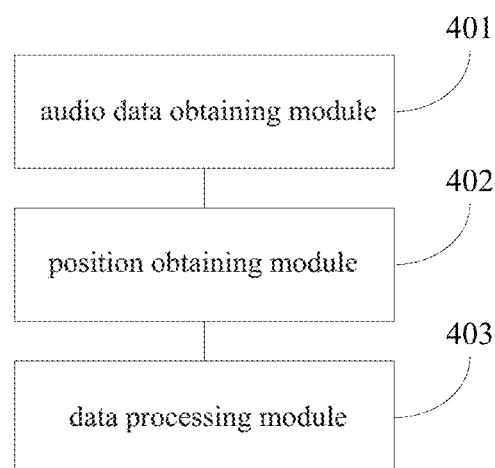
FIG. 4 is a schematic structural diagram of a speech processing apparatus according to embodiment(s) of the present disclosure.

In certain embodiment(s), the present disclosure further provides a voice processing apparatus. A schematic structural diagram of the voice processing apparatus provided by the embodiment(s) of the present disclosure is shown in FIG. 4, which may include: an audio data obtaining module 401, a spatial position obtaining module 402, and a data processing module 403.

The audio data obtaining module 401 is configured to obtain the first audio data of the target speaker and the second audio data of the environment where the target speaker is located; where the first audio data is acquired by the audio acquisition device worn by the target speaker, and the second audio data is acquired by the electronic device.

The spatial position obtaining module 402 is configured to obtain the spatial position of the target speaker relative to the electronic device.

The data processing module 403 is configured to mix the first audio data into the second audio data according to the spatial position to obtain target audio data; where, when the target audio data is output, the voice of the target speaker corresponds to the spatial location.

In the audio processing device provided by the embodiment(s) of the present disclosure, since the first audio data is acquired by the audio acquisition device on the target speaker, the clarity of the first audio data may be ensured, while the second audio data is acquired by the electronic device, which may ensure that the target audio data obtained after the mixing cover the entire audio of a larger scene. According to the spatial position of the target speaker relative to the electronic device, after mixing the first audio data with the second audio data, it is relatively ensured that the mixed target audio data can cover the entire large sound, while clearly outputting the sound of the target speaker. Moreover, due to the alignment of the target speaker's voice with the spatial position as the target audio data is being output, a spatial effect accuracy of the target speaker's voice in the target audio data may be accordingly ensured.

In certain embodiment(s), the second audio data is obtained according to audio data acquired by a microphone array of the electronic device; the spatial position obtaining module is configured to: calculate and obtain the spatial position of the target speaker relative to the electronic device according to the audio data acquired by the microphone array.

In certain embodiment(s), the spatial position obtaining module is configured to: acquire an image of the target speaker; process the image to determine the spatial position of the target speaker relative to the electronic device.

In certain embodiment(s), the data processing module is configured to: determine audio parameters of the first audio data in the electronic device according to the spatial position; and mix the first audio data into the second audio data according to the audio parameters.

In certain embodiment(s), the spatial location includes: an orientation and distance of the target speaker relative to the electronic device; when determining the audio parameters of the first audio data in the electronic device according to the spatial position, the spatial location obtaining module is configured to: determine audio parameters of the first audio data in audio channel of the second audio data according to the orientation and distance of the target speaker relative to the electronic device; When mixing the first audio data into the second audio data according to the audio parameters, the data processing module is configured to corresponding to each audio channel of the second audio data, mix audio parameters of the first audio data corresponding to the each audio channel into the each audio channel.

In certain embodiment(s), the audio parameters include at least one of: sound pressure, phase, and time delay.

In certain embodiment(s), when obtaining the first audio data of the target speaker, the audio data obtaining module is configured to: receive, through a wireless transmission channel, the audio data transmitted by the audio acquisition device on the target speaker.

Figure 5:
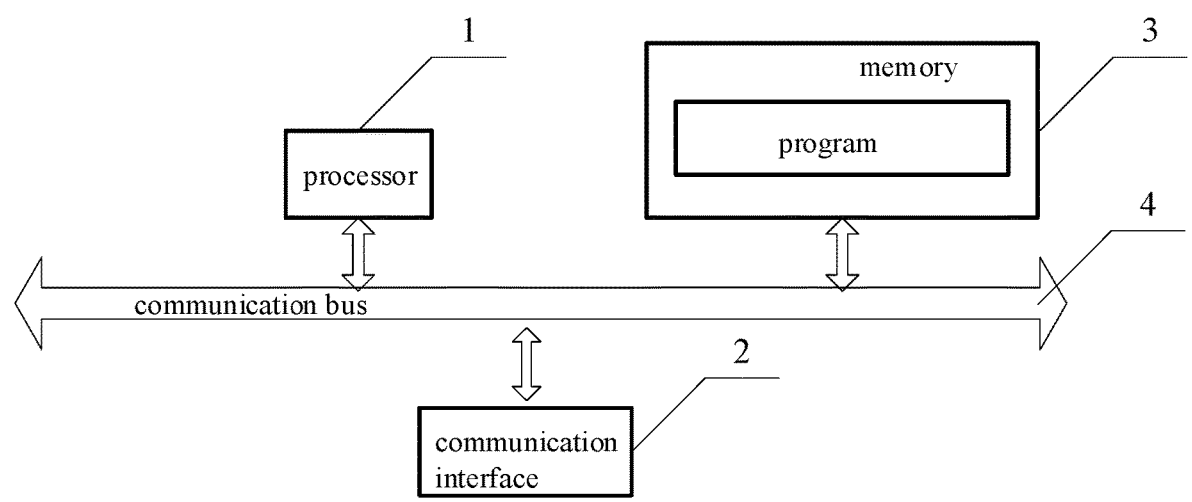
FIG. 5 is a schematic structural diagram of an electronic device according to embodiment(s) of the present disclosure.

In certain embodiment(s), the present disclosure further provides an electronic device. A schematic structural diagram of the electronic device is shown in FIG. 5, which may include: at least one processor 1, at least one communication interface 2, at least one memory 3 and at least one communication bus 4.

In certain embodiment(s), the number of the processor 1, the communication interface 2, the memory 3, and the communication bus 4 is at least one, and the processor 1, the communication interface 2, and the memory 3 communicate with each other through the communication bus 4.

The processor 1 may be a central processing unit (CPU), or an application specific integrated circuit (ASIC), or one or more integrated circuits configured to implement the embodiment(s) of the present disclosure, etc.

The memory 3 may include a high-speed RAM memory, may also include non-volatile memory (non-volatile memory) etc., such as at least one disk memory, where the memory 3 stores a program, the processor 1 can call the program stored in the memory 3. The program is used for: obtaining the first audio data of the target speaker and the second audio data of the environment where the target speaker is located, where, the first audio data is acquired by the audio acquisition device on the target speaker, and the second audio data is acquired by the electronic device; the spatial position of the target speaker relative to the electronic device is obtained; and the first audio data is mixed into the second audio data according to the spatial position, to obtain target audio data; and where, when the target audio data is output, the voice of the target speaker aligns with the spatial position.

In certain embodiment(s), for the refinement function and extension function of the program, reference may be made to the above description.

Embodiments of the present disclosure further provide a storage medium, where a program suitable for execution by a processor may be stored in the storage medium, the program being used to: obtain first audio data of a target speaker and second audio data on an environment where the target speaker is located; where, the first audio data is acquired by an audio acquisition device on the target speaker, and the second audio data is acquired by the electronic device; the spatial position of the electronic device is obtained according to the spatial position, the first audio data is mixed into the second audio data to obtain target audio data; where, when the target audio data is output, the voice of the target speaker aligns with the spatial location.

In certain embodiment(s), for the refinement function and extension function of the program, reference may be made to the above description.

Those of ordinary skill in the art can realize that the units and algorithm steps described in conjunction with the embodiment(s) disclosed herein may be implemented in electronic hardware, or a combination of computer software and electronic hardware. Whether functions are executed through the hardware or software depends on particular implementations and design constraints of the technical solution. Skilled artisans may implement the described functionality by employing different methods for each particular implementation, and such implementations should not be considered as beyond the scope of the present disclosure.

In the embodiment(s) provided in the present disclosure, the disclosed system, apparatus and method may be implemented in other manners. The shown or discussed relational coupling or direct coupling or communication connection may be carried out through interfaces, indirect coupling or communication connection of devices or units, and may be in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solution in the embodiments.

In addition, each functional unit according to embodiment(s) of the present disclosure may be integrated into one processing unit, or may each exist as an independent physical entity, or two or more units may be integrated into one unit.

According to embodiment(s) of the present disclosure, dependent claims, various embodiments, and features may be combined with each other, to solve the aforementioned technical problems.

When implemented in the form of software functional units and sold or used as independent products, the functions may be stored in a computer-readable storage medium. The technical solution of the present disclosure in essence, or a portion of the technical solution that presents a contribution to the existing art, or a portion of the technical solution, may be embodied in the form of a software product. The computer software may be stored in a storage medium, including several instructions that are used to cause a computing device (which for example may be a personal computer, a server, or a network device) to execute all or part of the steps of the methods described in the various embodiments of the present disclosure. The storage medium includes: U disk, mobile hard disk, Read-Only Memory (ROM, Read-Only Memory), Random Access Memory (RAM, Random Access Memory), magnetic disk or optical disk and other media that can store program codes.

The above description of the disclosed embodiments enables any person skilled in the art to make or use the present disclosure. Various modifications to these embodiments will be readily apparent to those skilled in the art, and the generic principles defined herein may be implemented in other embodiments without departing from the spirit or scope of the present disclosure. Therefore, the present disclosure is not intended to be limited to the embodiments shown herein, but is to be accorded the widest scope consistent with the principles and novel features disclosed herein.

What is claimed is:

1. An audio processing method, applied to an electronic device, the method comprising:
    obtaining first audio data of a target speaker and second audio data of an environment where the target speaker is located, wherein the first audio data is acquired by an audio acquisition device on the target speaker, and the second audio data is acquired by the electronic device, and the audio acquisition device and the electronic device are in an audio data acquisition state simultaneously to acquire the first audio data and the second audio data simultaneously;
    obtaining a position of the target speaker relative to the electronic device; and
    according to the position, combining, by the electronic device, the first audio data with the second audio data to obtain target audio data, to cause a voice of the target speaker to be aligned with the position when the target audio data is being output.

2. The audio processing method of claim 1, wherein the second audio data is obtained according to audio data acquired by a microphone array of the electronic device, and wherein obtaining the position of the target speaker relative to the electronic device comprises:
    obtaining the position of the target speaker relative to the electronic device according to the audio data acquired by the microphone array.

3. The audio processing method of claim 1, wherein obtaining the position of the target speaker relative to the electronic device comprises:
    obtaining an image of the target speaker;
    processing the image to determine the location of the target speaker relative to the electronic device.

4. The audio processing method of claim 1, wherein combining the first audio data with the second audio data according to the location comprises:
    determining audio parameters of the first audio data in the electronic device according to the position; and
    combining the first audio data with the second audio data according to the audio parameters.

5. The audio processing method of claim 4, wherein the location includes an orientation and a distance of the target speaker relative to the electronic device, and
wherein determining the audio parameters of the first audio data in the electronic device according to the position comprises: determining an audio parameter of an audio channel of the first audio data in the second audio data according to the orientation and distance of the target speaker relative to the electronic device; and
wherein combining of the first audio data with the second audio data according to the audio parameters comprises: corresponding to each audio channel of the second audio data, combining the first audio data with the audio channel according to the audio parameters parameter corresponding to the audio channel.

6. The audio processing method of claim 4, wherein the audio parameter includes at least one of a sound pressure, a phase, and a time delay.

7. The audio processing method of claim 1, wherein obtaining the first audio data of the target speaker comprises:
receiving, through a wireless transmission channel, the first audio data from the audio acquisition device on the target speaker.

8. An audio processing apparatus, comprising: a memory storing computer program instructions; and a processor coupled to the memory and configured to execute the computer program instructions and perform:
obtaining first audio data of a target speaker and second audio data of an environment where the target speaker is located, wherein the first audio data is acquired by an audio acquisition device on the target speaker, and the second audio data is acquired by the electronic device, and the audio acquisition device and the electronic device are in an audio data acquisition state simultaneously to acquire the first audio data and the second audio data simultaneously;
obtaining a position of the target speaker relative to the electronic device; and
according to the position, combining the first audio data with the second audio data to obtain target audio data, to cause a voice of the target speaker to be aligned with the position when the target audio data is being output.

9. The audio processing apparatus of claim 8, wherein the second audio data is obtained according to audio data acquired by a microphone array of the electronic device, and wherein obtaining the position of the target speaker relative to the electronic device includes:
obtaining the position of the target speaker relative to the electronic device according to the audio data acquired by the microphone array.

10. The audio processing apparatus of claim 8, wherein obtaining the position of the target speaker relative to the electronic device includes:
obtaining an image of the target speaker;
processing the image to determine the location of the target speaker relative to the electronic device.

11. The audio processing apparatus of claim 8, wherein combining the first audio data with the second audio data according to the location includes:
determining audio parameters of the first audio data in the electronic device according to the position; and
combining the first audio data with the second audio data according to the audio parameters.

12. The audio processing apparatus of claim 11, wherein the location includes an orientation and a distance of the target speaker relative to the electronic device, and
wherein determining the audio parameters of the first audio data in the electronic device according to the position includes: determining an audio parameter of an audio channel of the first audio data in the second audio data according to the orientation and distance of the target speaker relative to the electronic device; and
wherein combining of the first audio data with the second audio data according to the audio parameters includes: corresponding to each audio channel of the second audio data, combining the first audio data with the audio channel according to the audio parameters parameter corresponding to the audio channel.

13. The audio processing apparatus of claim 11, wherein the audio parameter includes at least one of a sound pressure, a phase, and a time delay.

14. The audio processing apparatus of claim 8, wherein obtaining the first audio data of the target speaker includes:
receiving, through a wireless transmission channel, the first audio data from the audio acquisition device on the target speaker.

15. A non-transitory computer-readable storage medium storing computer program instructions executable by at least one processor to perform:
obtaining first audio data of a target speaker and second audio data of an environment where the target speaker is located, wherein the first audio data is acquired by an audio acquisition device on the target speaker, and the second audio data is acquired by the electronic device, and the audio acquisition device and the electronic device are in an audio data acquisition state simultaneously to acquire the first audio data and the second audio data simultaneously;
obtaining a position of the target speaker relative to the electronic device; and
according to the position, combining the first audio data with the second audio data to obtain target audio data, to cause a voice of the target speaker to be aligned with the position when the target audio data is being output.

16. The non-transitory computer-readable storage medium of claim 15, wherein the second audio data is obtained according to audio data acquired by a microphone array of the electronic device, and wherein obtaining the position of the target speaker relative to the electronic device includes:
obtaining the position of the target speaker relative to the electronic device according to the audio data acquired by the microphone array.

17. The non-transitory computer-readable storage medium of claim 15, wherein obtaining the position of the target speaker relative to the electronic device includes:
obtaining an image of the target speaker;
processing the image to determine the location of the target speaker relative to the electronic device.

18. The non-transitory computer-readable storage medium of claim 15, wherein combining the first audio data with the second audio data according to the location includes:
determining audio parameters of the first audio data in the electronic device according to the position; and
combining the first audio data with the second audio data according to the audio parameters.

19. The non-transitory computer-readable storage medium of claim 18, wherein the location includes an orientation and a distance of the target speaker relative to the electronic device, and
wherein determining the audio parameters of the first audio data in the electronic device according to the position includes: determining an audio parameter of an audio channel of the first audio data in the second audio data according to the orientation and distance of the target speaker relative to the electronic device; and wherein combining of the first audio data with the second audio data according to the audio parameters includes: corresponding to each audio channel of the second audio data, combining the first audio data with the audio channel according to the audio parameters parameter corresponding to the audio channel.

20. The audio processing method of claim 1,
wherein the image of the target speaker is a first image, the method further comprising:
- determining an orientation of the target speaker relative to the electronic device;
- determining a focus orientation of an image acquisition device according to a second image; and
- in response to the focus orientation of image acquisition device being different from the orientation of the target speaker relative to the electronic device, switching the target speaker to a new audio source.

\* \* \* \* \*